United States Patent [19]
Smith et al.

[11] Patent Number: 5,342,119
[45] Date of Patent: Aug. 30, 1994

[54] TRACTION CONTROL SYSTEM VALVE

[75] Inventors: G. Fred Smith; LaVerne A. Caron; James A. Beverly, all of Kalamazoo, Mich.

[73] Assignee: Eaton Corporation, Cleveland, Ohio

[21] Appl. No.: 997,345

[22] Filed: Dec. 28, 1992

[51] Int. Cl.$^5$ .................. B60T 11/28; B60T 13/26
[52] U.S. Cl. ........................ 303/113.2; 303/118.1; 303/901
[58] Field of Search ............... 303/9.66, 15, 16, 84.1, 303/110, 113.1–113.2, 118.1, 119.1, 901, 119.2, 3; 137/112

[56] References Cited

U.S. PATENT DOCUMENTS

| | | | |
|---|---|---|---|
| 3,768,519 | 10/1973 | Morse | 303/118.1 X |
| 4,230,377 | 10/1980 | Goebels | 303/119.2 X |
| 4,819,995 | 4/1989 | Lohmann et al. | 303/113.2 |
| 4,846,532 | 7/1990 | Friedow et al. | 303/113.2 |
| 4,890,890 | 1/1990 | Leiber | 303/9.63 |
| 5,042,883 | 8/1991 | McCann et al. | 303/15 X |
| 5,184,878 | 2/1993 | Woerner | 303/119.2 X |
| 5,211,449 | 5/1993 | Amtsfeld | 303/9.66 |

FOREIGN PATENT DOCUMENTS 3942564 6/1991 Fed. Rep. of Germany ...... 303/901

*Primary Examiner*—Robert J. Oberleitner
*Assistant Examiner*—Josie A. Ballato
*Attorney, Agent, or Firm*—Brooks & Kushman

[57] ABSTRACT

A valve, for use with a vehicular brake system including an electronic control unit, including a valve body, a pressure regulator internal to the body, a solenoid valve internal to the body and a double-check valve internal to the body. The electronic control unit (ECU) controls the traction control valve during two modes of vehicle operation. The regulator assembly is in fluid communication with the pressurized air supply and regulates the air supplied to the brake system during one mode of operation. The solenoid valve receives pressure-regulated air from the regulator assembly and is controlled by the electronic control unit during the two modes of operation. The single double-check valve receives pressure-regulated air from the solenoid valve and receives pressurized air from the supply, such that the double-check valve allows the pressure-regulated air to flow from the solenoid valve to the brake system during the one mode of operation, and allows the pressurized air to flow from the pressurized air supply to the brake system during the other mode of operation.

15 Claims, 6 Drawing Sheets

TRACTION CONTROL SYSTEM VALVE

TECHNICAL FIELD

The present invention relates to a valve for use in vehicular braking systems and, more particularly, to a valve for enhancing a vehicular braking system to include traction capability.

BACKGROUND ART

As is known, there exists anti-locking brake and drive traction regulation systems for use on motor vehicles equipped with air brake systems. With anti-locking brake systems, the goal is to prevent locking of the braked wheels, enhancing the ability to maintain control of the vehicle during braking situations. To achieve this goal, braking forces are reduced when an impending lock-up is sensed and increased when the impending lock-up ceases to exist. With drive traction regulation systems, the goal is to prevent the drive wheels from slipping during acceleration of the vehicle. To achieve this goal, braking forces can be applied to the slipping wheels, thereby increasing torque to the non-slipping wheels.

A drive traction regulation system can employ other strategies as well, such as reducing motor torque by controlling combustion, or by upshifting if an automatic transmission is involved. Due to similarities in the hardware required to implement them, anti-lock and drive traction regulation systems often co-exist on vehicles.

Referring now to FIG. 1, there is illustrated a block diagram of an existing combination anti-lock braking/drive traction regulation system shown generally by the reference numeral 20. The combination system 20 includes an electronic control module 22, multiple wheel speed sensors 24, multiple anti-lock brake valves 36, multiple double-check valves 28 and multiple high flow traction control valves 26.

During the traction control event, the vehicle is accelerating and as such, there is torque applied to the rear wheels 30. When the electronic control module 22 senses a slipping rear wheel based upon data from the wheel speed sensors 24, it energizes the traction control valve 26 on the slipping wheel only. This causes the pressure from reservoirs 32 to be applied via line 34 to the appropriate double-check valve 28, on through the anti-lock valve 36 and to the brake chamber 38. Applying the brakes to the slipping wheel causes the torque (which normally takes the path of least resistance) to be transferred to the non-slipping wheel, thus providing enhanced traction capability. The anti-lock valve 36 will then be used to control the pressure on the slipping wheel such that the optimal traction condition can be maintained. A similar system which employs multiple valves and multiple double-check valves is described in U.S. Pat. No. 4,819,995, issued to Löhmann et al.

Referring now to FIG. 2, there is illustrated a block diagram for another existing combination anti-lock/traction control system, shown generally by reference numeral 50. As shown, the combination system 50 includes an electronic control unit 52, multiple wheel speed sensors 54, a single high flow traction control valve 56, multiple anti-lock brake valves 58 and multiple double-check valves 60.

During the traction control event, the vehicle is accelerating and as such, there is torque applied to the rear wheels 62. When the electronic control module 52 senses a slipping wheel based upon data from the wheel speed sensors 54, it energizes the traction control valve 56 and energizes the ABS valve 58 associated with the non-slipping wheel. Energizing the traction control valve 56 results in air flow from the reservoir 64 to the double-check valves 60, thus causing them to seal off air to lines 66. This prevents the air from being exhausted out through the relay valve 68. This air then continues on to the ABS valves 58. The ABS valve 58 associated with the non-slipping wheel is energized and as such, it does not allow air to flow to the associated brake chamber 70. The ABS valve 58 associated with the slipping wheel will allow air to pressurize the associated brake chamber 70 and as such, the torque will be transferred to the non-slipping wheel. The anti-lock valve 58 will then be used to control the pressure on the slipping wheel such that the optimal traction condition can be maintained.

The design of both traction control systems 20 and 50 is such that they require the traction control valves to supply air from the high pressure system reservoir directly to the brake chambers. The fact that the brake chambers are of an appreciable volume and that the traction control system must react reasonably quickly, requires these valves and the associated double check valves to be of a design level that provides a high flow capability. This makes these valves large and complex and as such, more costly. The braking forces required for traction control are also only a fraction of those required for full braking. Therefore, applying the full system pressure to the brake chambers, as is done in both systems 20 and 50, makes the control of these systems more difficult.

It is, therefore, desirable to provide a traction control system with less components and that these components be of a less complex and less costly design level. Also, it is desirable to utilize a control pressure that is at a lower level than full system pressure.

DISCLOSURE OF THE INVENTION

It is, therefore, an object of the present invention to provide an improved valve, for use with an anti-lock brake/traction control system, having less hardware, being less complex and less costly.

It is further object of the present invention to provide an improved valve that utilizes a control pressure that is less than the system pressure.

In carrying out the above objects, and other objects and features of the present invention, a valve is provided for use with an anti-lock brake/traction control system is provided. The valve is located on the control line of the relay valve, such that one low flow valve and one low flow double-check valve can be used. The valve also includes a pressure regulator, such that a more desirable control pressure can be attained. Most preferably, a pressure regulator, an electrically controlled low flow 3-way valve and a single double-check valve are preferably combined into one valve body thus simplifying the system even further.

In further carrying out the above object and other objects and features of the present invention, a valve is provided, for use with a vehicular air brake system including an electronic control unit, for controlling air flow from a pressurized air supply to the brake system during two modes of vehicle operation. The valve comprises a valve body and a regulator assembly internal to the valve body in fluid communication with the pressurized air supply. The regulator assembly pressure-regulates the air supplied to the brake system during one of the two modes of operation. The valve also includes a solenoid valve internal to the valve body for receiving pressure-regulated air from the regulator assembly. The solenoid valve is controlled by the electronic control unit during the two modes of operation. The valve also includes a single double-check valve internal to the body and in fluid communication with the solenoid valve and the pressurized supply. The double-check valve allows the pressure-regulated air to flow from the solenoid valve to the brake system during the one mode of operation, and allows the pressurized air to flow from the pressurized air supply to the brake system during the other mode of operation.

The advantages accruing to the present invention are numerous. For example, the valve of the present invention is designed to be incorporated into a standard air brake system that is configured with an existing anti-lock brake system and a relay valve on the rear brakes. The design of the valve is such that it will be located on the control, or low flow, side of the relay valve, as opposed to existing traction valves that are located on the output or high flow side of the relay valve. Valve complexity is reduced, reducing the associated cost.

When energized, the solenoid valve portion of the present invention allows air at a regulated pressure to flow to the control line of the relay valve. The double-check valve portion of this invention seals off the portion of the relay valve control line that returns to the treadle valve, thus preventing this air from exhausting out to atmosphere through the treadle valve. The relay valve, being a flow amplifier for the rear brake chambers, provides a high flow source of air to the rear brake chambers at the regulated control pressure level determined by this invention.

Upon energizing of the present invention, the electronic control unit energizes the anti-lock brake valve on the non-slipping wheel. This blocks the air to this wheel and applies the brakes to the slipping wheel, thus resulting in a transfer of torque and improved traction on the non-slipping wheel. When de-energized, this valve exhausts the pressure at the control line of the relay valve and, as such, causes the relay valve to exhaust pressure on the rear brakes. During normal operation, the double-check valve of the present invention shuttles to seal the normal relay valve control air from exhausting out to atmosphere through this invention.

The above objects and other objects, features, and advantages of the present invention will be readily appreciated by one of ordinary skill in the art from the following detailed description of the best mode for carrying out the invention when taken in connection with the accompanying drawings.

BEST MODE FOR CARRYING OUT THE INVENTION

Figure 1:
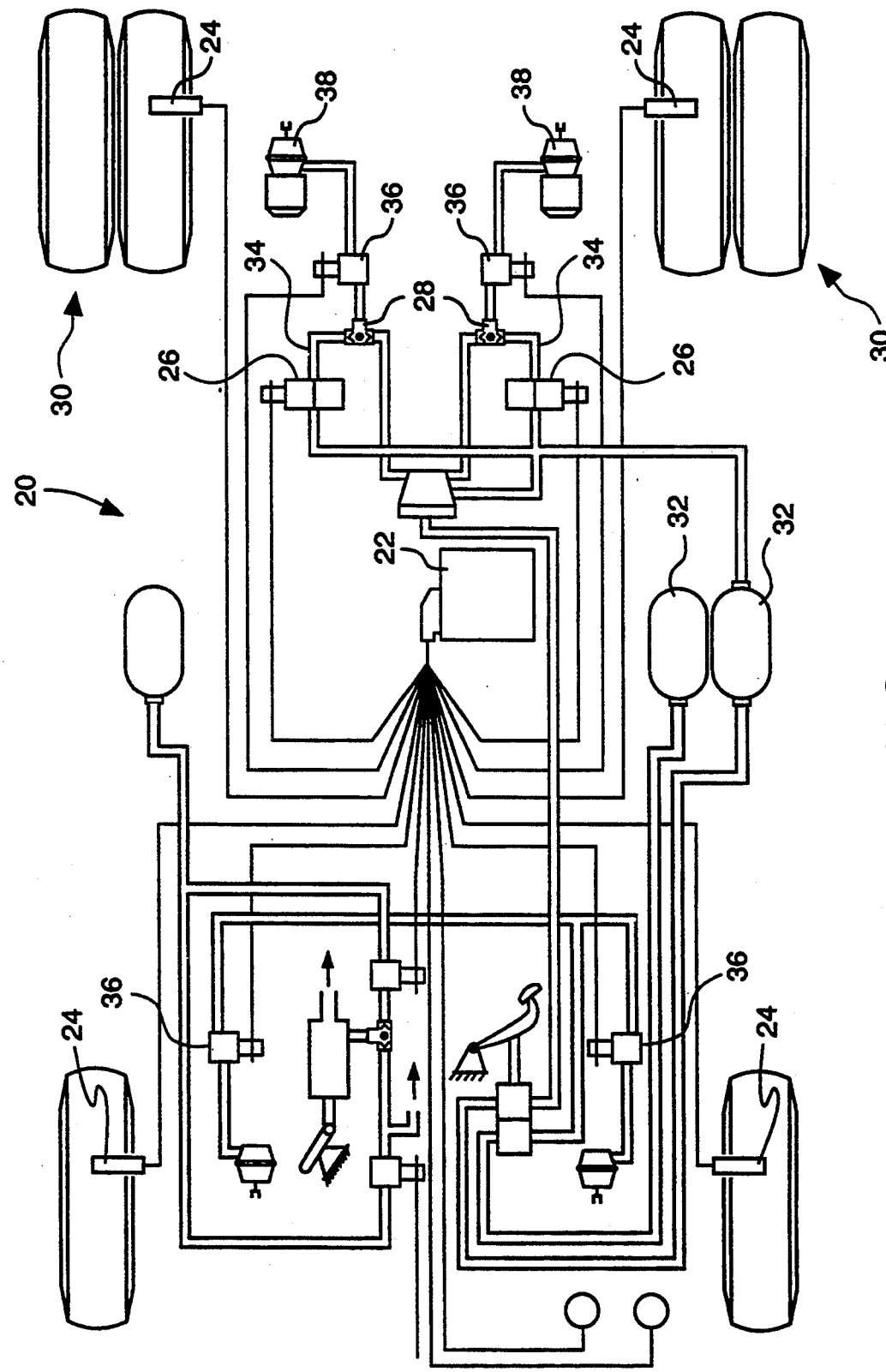
FIG. 1 is a block diagram of an existing combination anti-lock brake/drive traction regulation system.
Figure 2:
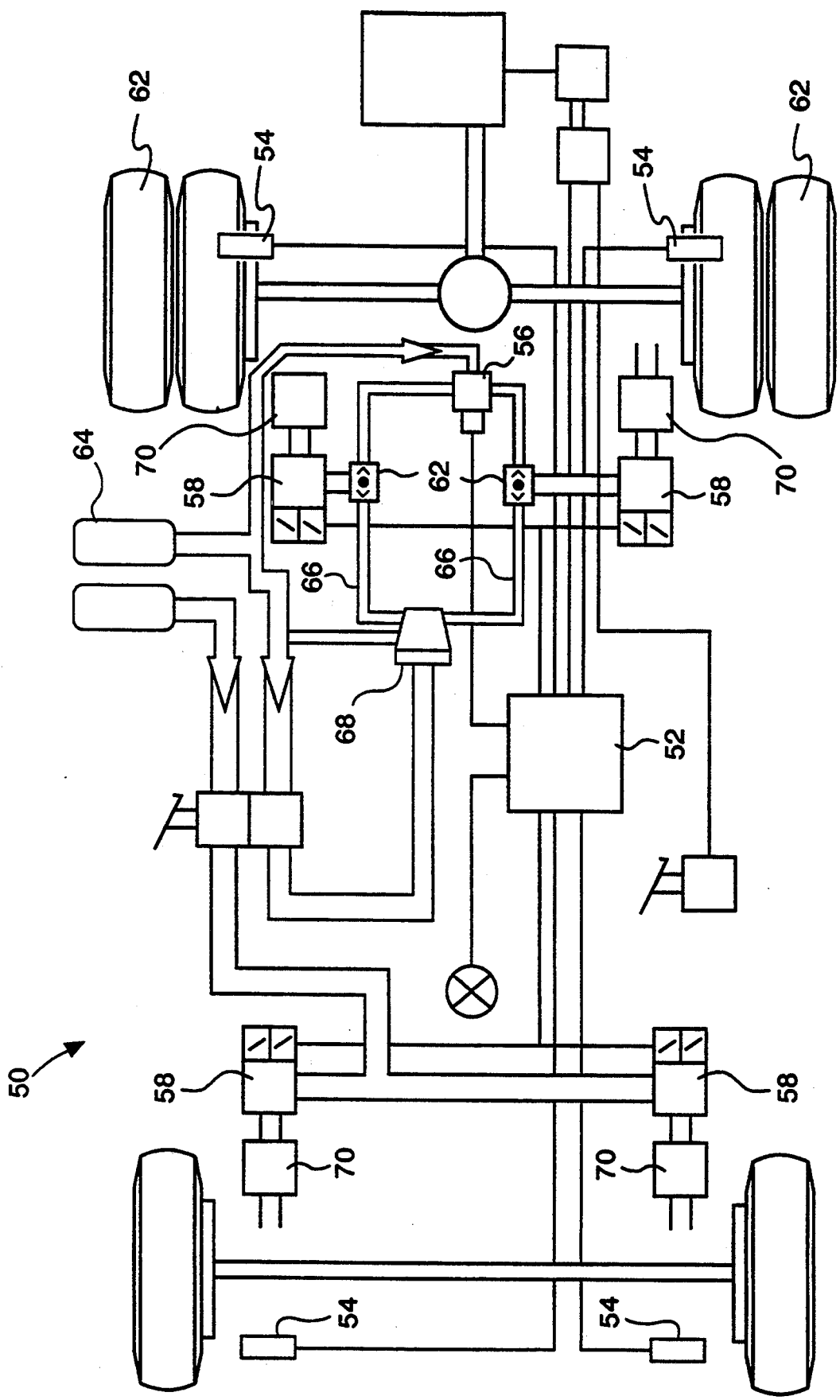
FIG. 2 is a block diagram illustrating another existing combination anti-lock brake/drive traction regulation system.
Figure 3:
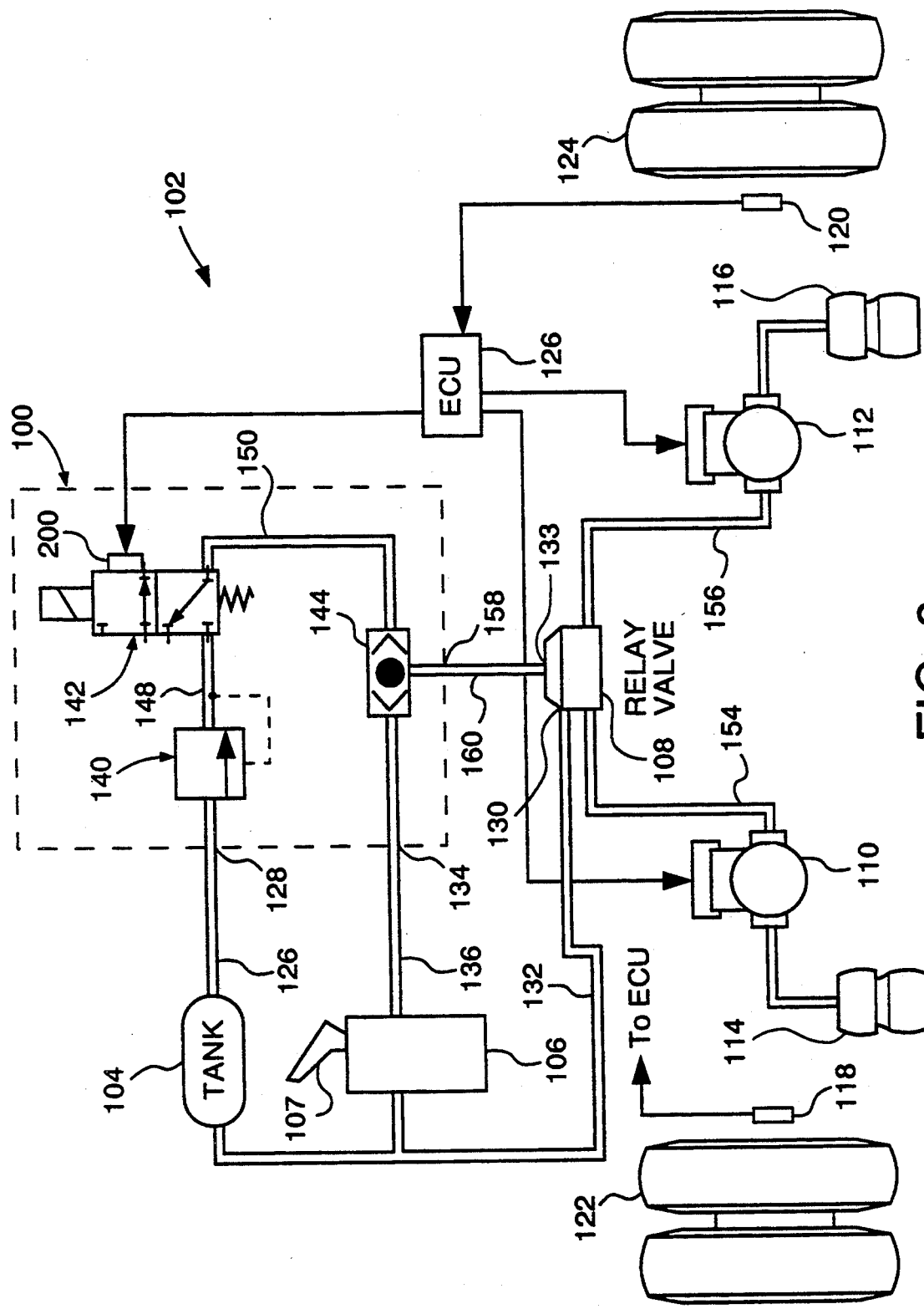
FIG. 3 is a block diagram of an improved combination anti-lock brake/drive traction regulation system, including a block diagram 100 of the valve of the present invention.

Referring now to FIG. 3, there is illustrated a block diagram of a valve shown generally by reference numeral 100 for use with a combination anti-lock brake/-drive traction regulation system shown generally by reference numeral 102. As illustrated, the system 102 includes a pressurized source of air, or tank 104, a treadle valve 106 including a brake pedal 107, a brake air system relay valve 108, anti-lock braking system (ABS) valves 110 and 112 and air chambers 114 and 116. The wheel sensors 118 and 120 provide speed data for the wheels 122 and 124 to an electronic control unit (ECU) shown generally by reference numeral 126. Based on this data, the electronic control unit 126 can detect an impending lock-up of wheels 122 or 124 during vehicle braking or an actual slip of wheels 122 or 124 during vehicle acceleration. Depending on the condition detected (i.e. wheel lock-up or wheel slip), the electronic control unit 126 controls operation of the valve 100 and the ABS valves 110 and 112, as described in greater detail herein below.

With continuing reference to FIG. 3, the tank 104 supplies air under pressure to the supply ports of valve 100, the treadle valve 106 and the brake air system relay valve 108. The air supplied from the tank 104 has a pressure associated with a typical compressor setting, such as 90–120 psi. Thus, air in that pressure range enters the valve 100 through supply line 127 via the supply input port shown by reference numeral 128. Air in this pressure range also enters the brake air system relay valve 108 at the supply input 130 via supply line 132. Pressurized air is also supplied to the valve 100 at the treadle valve input 134 via treadle supply line 136. The pressure of the air supplied to the valve 100 from the treadle valve 106 varies from zero psi to about 100 psi, depending on the force exerted by the vehicle operator on the brake pedal 107.

As shown in FIG. 3, the valve 100 preferably has a body and includes an internal regulator assembly shown generally by reference numeral 140, an internal 3-way solenoid valve shown generally by reference numeral 142 and an internal single double-check valve shown generally by reference numeral 144. The regulator assembly, solenoid valve and double-check valve are described as internal since they are disposed within the body of the valve. The solenoid valve 142 is commercially available from Rostra Controls of Laurinburg, N.C., United States of America. The internal regulator assembly components 140, commercially available from Norgren Corporation of Littleton, Colo., United States of America, are in fluid communication with the supply line 126 from the tank 104. The regulator assembly 140 functions to regulate the tank or brake system pressure down to a level of approximately 40 psi.

Figure 4:
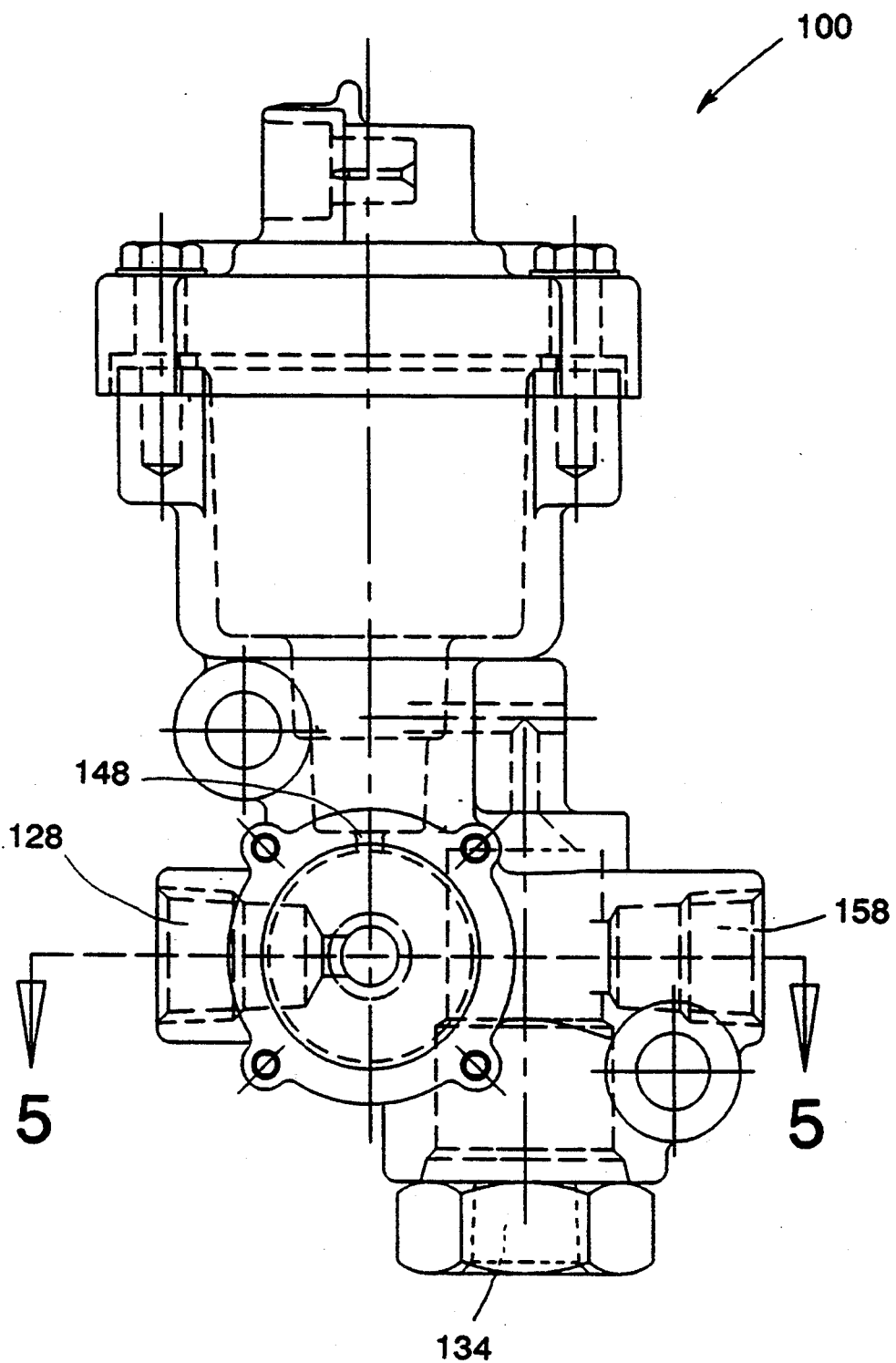
FIG. 4 is a side view of the valve shown by the block diagram in FIG. 3 of the present invention.
Figure 5:
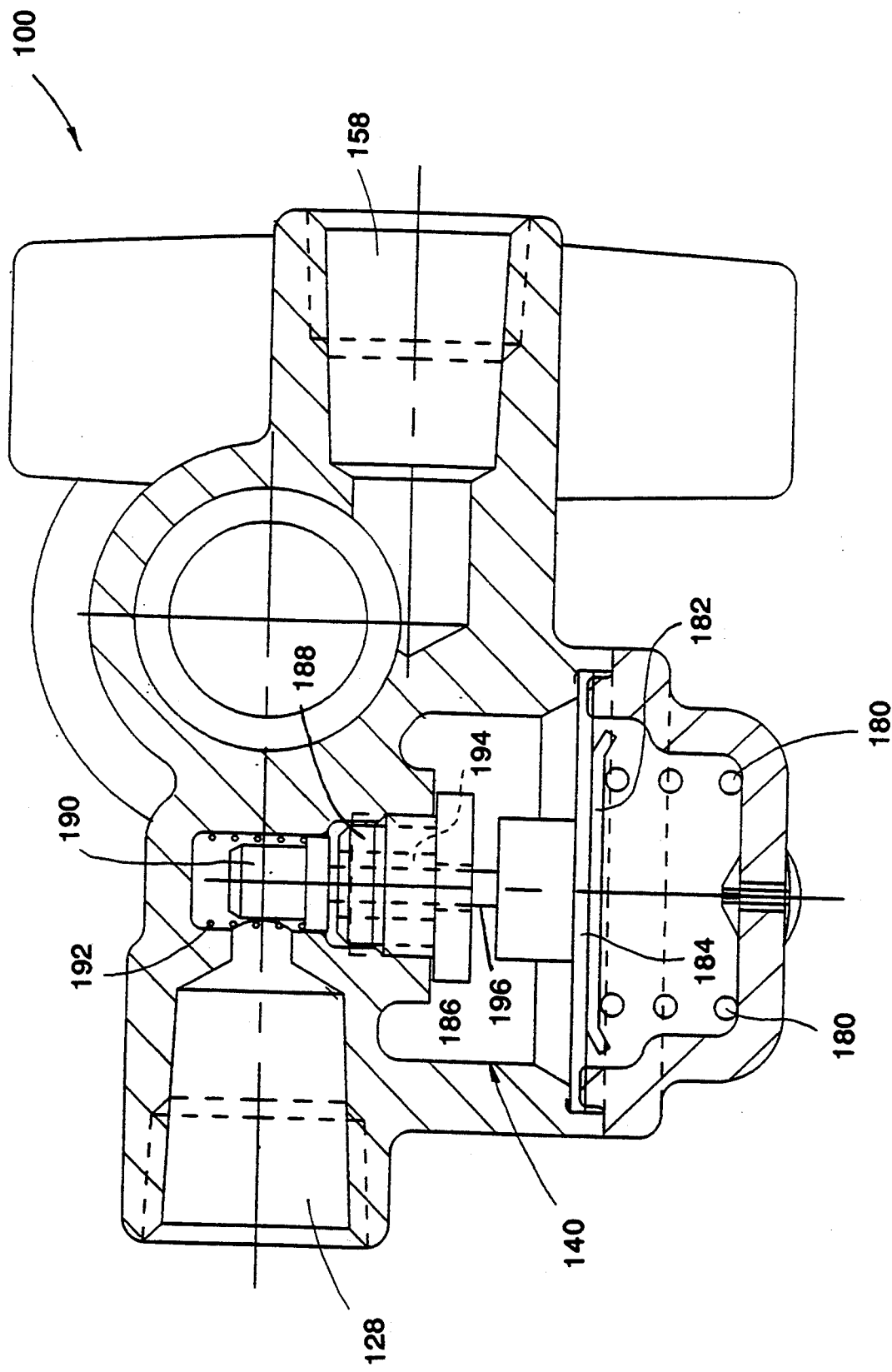
FIG. 5 is a cross-section of the valve shown in FIG. 4 taken along line 5—5, illustrating the internal pressure regulator.
Figure 6:
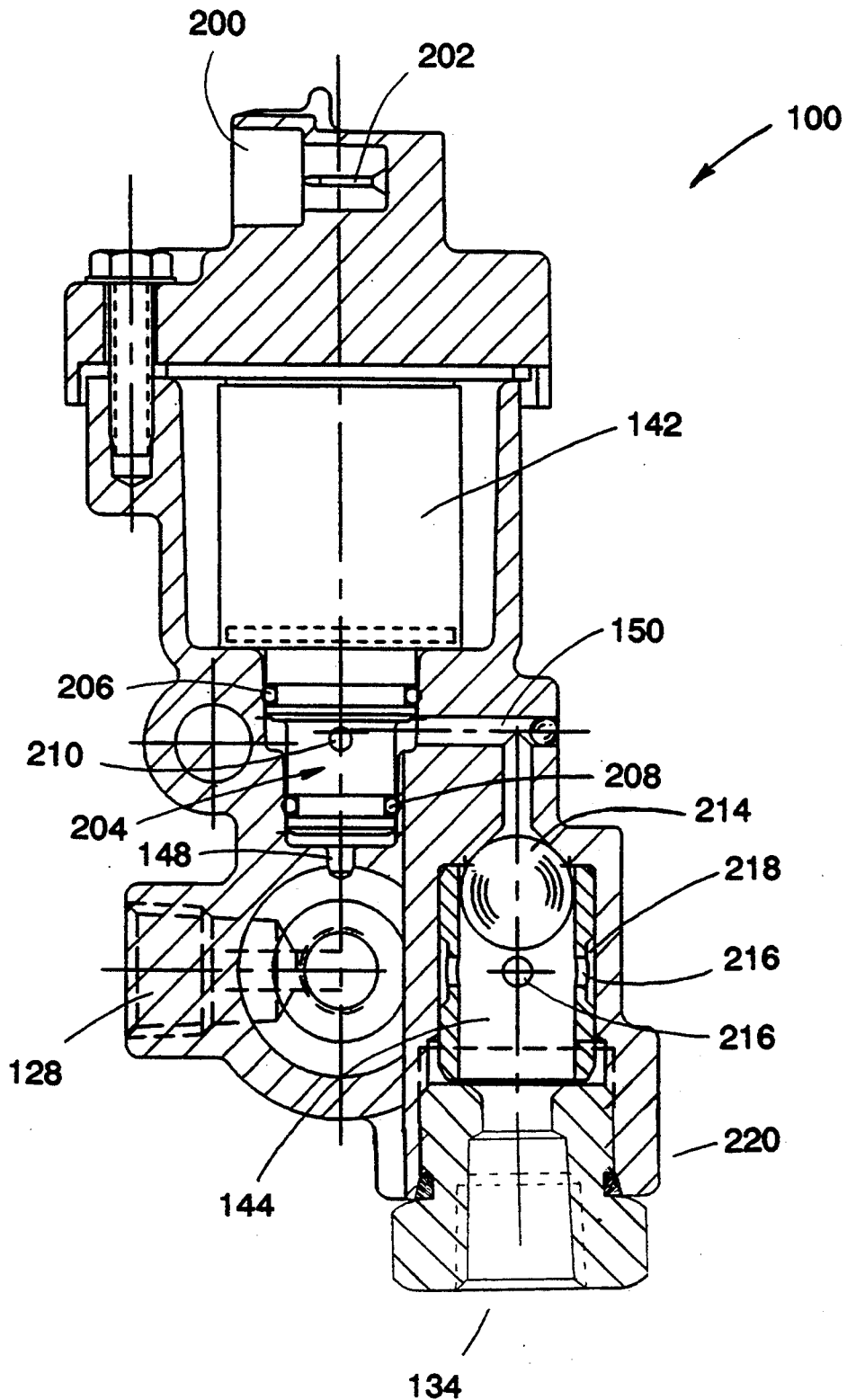
FIG. 6 is a cross-section partly in elevation and partly broken away of the valve shown in FIG. 4 and taken along the line 6—6 in FIG. 5, illustrating the internal solenoid valve and the single internal double-check valve.

Referring now to FIGS. 4, 5 and 6, the valve 100 is shown in greater detail. As best shown in FIG. 5, the internal regulator assembly 140 includes a spring 180, a spring retainer plate 182, a rubber diaphragm 184, a cavity 186, a guide bushing 188, plunger 190 and a spring 192 which surrounds the plunger 190.

With continuing reference to FIGS. 4 and 5, with no air pressure at supply input port 128, the spring 180 expands, biasing the spring retainer plate 182 and rubber diaphragm 184 upward, such that the rod 196 comes into contact with plunger 190. When pressurized air is applied to the supply input port 128, air flows through orifices 194 (shown in phantom) and fills the cavity 186. As the pressure rises in cavity 186, the diaphragm 184 and the spring retainer plate 182 are biased downward. This continues until a point where the travel of rod 196 is such that plunger 190 can be forced by spring 192 to seal on the guide bushing 188. This results in the pressure in cavity 186 stabilizing at a steady value.

The spring rate of spring 180 and the area of the rubber diaphragm 184 determine the regulated pressure. In the preferred embodiment, the spring 180 has a spring rate value and the diaphragm 184 is sized such that the regulated pressure delivered to the solenoid valve 142 through fluid connection 148 is about 40 psi.

Referring now to FIG. 6, a cross-section partly in elevation of the valve 100 is shown, illustrating the internal solenoid valve assembly 142 and the single internal double-check valve 144. As shown in FIGS. 3 and 6, the valve 100 includes a connector receptacle 200. Electrical wires extend from the solenoid valve 142 to the plurality of contacts 202. The receptacle 200 receives a connector plug (not shown), which is electrically connected by wires to the ECU 126.

As best shown in FIG. 6, the solenoid valve 142 includes a port assembly shown generally by reference numeral 204. In the preferred embodiment, the port assembly 204 includes a pair of O-rings 206 and 208, and remains stationary within the valve 100. A plunger assembly (not specifically illustrated) is positioned within the port assembly 204. The plunger assembly moves relative to the port assembly 204, in a known fashion, upon energization/deenergization of the solenoid valve 142 by the ECU 126 to control air flow to the single double-check valve 144.

With continuing reference to FIG. 6, pressure regulated air from the regulator assembly 140 is delivered to the low flow solenoid valve 142 through the fluid connection 148. When the electronic control unit 126 activates this solenoid to the energized state, a plunger (not specifically illustrated) in the valve moves upward, thus opening up an inlet port and sealing an exhaust port (not specifically illustrated). The pressurized air then flows through the valve and out the working port 210. This air then travels down fluid connection 150 and on to the double check valve 144. When the low flow solenoid valve is de-energized, the plunger in the valve returns to its original state via a spring return. This seals off the inlet air and opens up the exhaust port, thus allowing the air that was supplied to the double check 144 through fluid connection 150 to exhaust to atmosphere.

With combined reference to FIGS. 3 and 6, the valve 100 is preferably machined to include a single internal double-check valve 144. The ball 214 of the double-check valve is biased from end to end therewithin in a known manner. As best shown in FIG. 6, the double-check valve 144 preferably includes a plurality of ports 216 disposed radially around the central portion of the double-check valve. Most preferably, the ports 216 are relatively small so as not to nick or otherwise damage the surface of the ball 214 as it moves within the double-check valve 144. The ports 216 are in fluid communication with an annulus 218, which in turn is in fluid communication with the control air line port 158 (best shown in FIG. 5).

In FIG. 6, the ball 214 is shown biased to one end due to air pressure entering the double-check valve 144 from the treadle valve input port 134. This pressurized air then exits the double-check valve 144 through the ports 216, the annulus 218 and the control air line port 158, shown in FIGS. 4 and 5. The O-ring 220 functions as a seal to insure against air leaks.

Returning once again to FIG. 3, operation of the valve 100 will be discussed during normal braking and during traction control. Pressure regulated air from the regulator assembly 140 is communicated to the solenoid valve 142 via the supply air line 148. The electronic control unit 126 energizes the solenoid valve 142 depending on whether a traction control situation exists. As described in greater detail below, the electronic control unit 126 controls the solenoid valve 142 to a deenergized state during normal braking and to an energized state during traction control.

During normal braking, the operator applies force to the brake pedal 107, thus opening the treadle valve 106 and supplying pressurized air from the tank 104 to the line 136 and on to the treadle input port 134 of the traction control valve 100. This pressurized air varies from 0 to approximately 100 psi depending upon the force applied by the operator on the brake pedal. The air flow through the traction control valve 100 displaces the ball in the double check valve 144 away from the direction of flow, thus sealing off the internal line 150 in the traction valve. This results in the air pressure being sealed from leaking out to atmosphere through the low flow solenoid valve 142. The air, sealed from exhausting to atmosphere, now travels out of the traction valve 100 via the relay port 158 and on to the control chamber of the relay valve 108.

In the preferred embodiment, the relay valve 108 includes an internal piston and spring assembly. In its normal state, the spring biases the piston closed, thus sealing one port which allows the supply air from tank 104 from being communicated to the brake chambers and also opening up another port which exhausts any air currently in the brake chambers to atmosphere. When air enters the control chamber via line 160, this forces the piston downward, thus opening the supply port and closing the exhaust port in the relay valve. This allows air from the tank 104 to be communicated to the brake chambers. This air travels from the tank 104 through line 132, and then through the relay valve 108. It continues down lines 154 and 156, through the normally opened anti-lock valves 110 and 112 and on to the brake chambers 114 and 116 so as to provide force to apply the brakes. Thus, the relay valve 108 acts as a flow amplifier by taking a small flow at a given pressure at the control port and converting it to a much larger flow at the same pressure at the outlet ports.

When the operator releases his foot from the brake pedal 107, it in turn causes the air in the control port 133 of the relay valve 108 to be exhausted through line 160 and line 136 out through the treadle valve 106. The ball 214 in the double-check 144 of the traction control valve 100 remains in the state it was previously in until the pressure in this line is exhausted. Removing the control pressure from the relay valve causes the piston to return to its original state, closing the supply port and opening the exhaust port for the brake chamber air.

During normal braking conditions, the ECU 126 monitors the wheels 122 and 124, utilizing the wheel speed sensors 118 and 120. If a wheel lock-up, or wheel skid, is detected the braking pressure on the wheels is too great. In response, the ECU 126 controls the appropriate ABS valve 110, 112 to reduce the air pressure delivered to the air chamber, so that the wheel can rotate on the road surface during braking.

As previously mentioned, the valve 100 provides the system 102 with traction control capabilities. Generally, a traction control situation arises as the vehicle is accelerated from a resting position. When accelerating hard or when accelerating during less than optimal driving conditions, the wheel having the lowest coefficient of friction surface can break free and spin on the road surface. This spinning wheel becomes the path of least resistance for the driveline, and all of the driveline torque flows out through that wheel, resulting in degraded vehicle acceleration and increased tire wear. By applying brake pressure to the spinning wheel, torque is transferred to a wheel having a higher coefficient of friction with the road surface.

With continuing reference to FIG. 3, the ECU 126 monitors the wheel speed sensors 118 and 120 to detect the occurrence of a traction control situation. Generally, the ECU 126 enters a traction control mode when the wheel speed sensors 118 and 120 on the drive axles indicate a wheel spinning at a speed greater than on a non-driven axle.

For example, assume the vehicle is accelerating and the ECU 126 has detected that wheels 122 have lost traction and are spinning. To regain traction, the ECU 126 energizes the solenoid valve 142. As described in greater detail above, pressure regulated air (i.e. about 40 psi) from the regulator assembly 140 flows through the delivery air line 150 to the double-check valve 144. Since the vehicle driver is not depressing the brake pedal 107, this pressure regulated air biases the ball 214 of the double-check valve 144 away from the delivery air line 150, allowing the air to exit the double-check valve and flow to the relay valve 108 through the control line 160.

The pressure regulated air displaces the internal piston of the relay valve 108, and air at an equivalent pressure (i.e. about 40 psi) exits the valve 108 and flows to the ABS valve 110 and 112 through the brake air lines 154 and 156.

At the instant that the ECU 126 energizes the traction control valve 100, it also energizes the anti-lock brake valve 112 associated with the non-slipping wheels 124. This blocks the flow of air to the non-slipping wheel brake chamber 116 and, as such, prevents brake torque from being applied to this wheel. Air is, however, allowed to pass to the brake chamber 114 of the slipping wheel and thus, the brakes of this wheel are applied. By this method, the torque, which normally takes the path of least resistance (i.e. the slipping wheel), will be directed to the non-slipping side and, as such,. allow the vehicle to accelerate. As the traction control event continues, the anti-lock brake valves 110 and 112 will be used to control the brake pressures in both wheels such that the optimal traction conditions are maintained.

At speeds above about ten miles per hour or when the ECU determines that wheel slip is no longer present, the traction control valve will be de-energized. This will allow the air in the control port 130 of the relay valve 108 to be exhausted via lines 160, traction control valve internal line 150 and out through the exhaust port of the solenoid 142. The ball in the double-check valve 144 of the traction control valve 100 will remain in position sealing off the treadle input line until the pressure in the valves drops to almost 0 psig. Exhausting the control air of the relay valve in turn causes the air in brake chambers to also be exhausted through the relay valve thus returning the entire brake system to its normal state.

One of ordinary skill in the art will recognize many advantages associated with the use of the valve 100. For example, a combination anti-lock brake and traction control system can be designed utilizing less hardware than existing systems. A single smaller valve can be utilized, positioned on the control side of the brake system relay valve. Additionally, a substantial cost savings is realized, since mechanical hardware in the form of a mechanical traction interlock on the axle is no longer required.

It is understood, of course, that while the form of the invention herein shown and described constitutes the preferred embodiment of the invention, it is not intended to illustrate all possible forms thereof. It will also be understood that the words used are words of description rather than limitation, and that various changes may be made without departing from the spirit and scope of the invention as disclosed.

What is claimed is:

1. A valve, for use with a vehicular air brake system including an electronic control unit, for controlling air flow from a pressurized air supply to the brake system during two modes of vehicle operation, the valve comprising:
    a valve body;
    a regulator assembly internal to the valve body in fluid communication with the pressurized air supply, the regulator assembly for pressure-regulating the air supplied to the brake system during one of the two modes of operation;
    a solenoid valve internal to the valve body for receiving pressure-regulated air from the regulator assembly, the solenoid valve being controlled by the electronic control unit during the two modes of operation; and
    a single double-check valve internal to the valve body in fluid communication with the solenoid valve and the pressurized air supply, the double-check valve allowing the pressure-regulated air to flow from the solenoid valve to the brake system during the one mode of operation, and allowing the pressurized air to flow from the pressurized air supply through a treadle valve to the brake system during the other mode of operation.

2. A valve, for use with a vehicular air brake system including an electronic control unit, for controlling air flow from a pressurized air supply to the brake system during two modes of vehicle operation, the valve comprising:
    a valve body;
    a regulator assembly internal to the valve body in fluid communication with the pressurized air supply, the regulator assembly for pressure-regulating the air supplied to the brake system during one of the two modes of operation;
    a solenoid valve internal to the valve body for receiving pressure-regulated air from the regulator assembly, the solenoid valve being controlled by the electronic control unit during the two modes of operation;

a single double-check valve internal to the valve body in fluid communication with the solenoid valve and the pressurized air supply from a treadle valve, the double-check valve allowing the pressure-regulated air to flow from the solenoid valve to the brake system during the one mode of operation, and allowing the pressurized air to flow from the pressurized air supply to the brake system during the other mode of operation; and wherein the brake system includes a relay valve having a control air line in fluid communication with the double-check valve, the relay valve amplifying the flow and maintaining the pressure of the air provided to the brake system from the solenoid valve during the one mode of operation.

3. The valve of claim 2 wherein the relay valve amplifies the flow and maintains the pressure of the air provided to the brake system from the pressurized supply during the other mode of operation.

4. A valve for controlling the traction of at least one vehicle wheel slipping on a road surface, the traction control valve for use with a vehicular air brake system including at least one brake valve controlled by an electronic control unit, the traction control valve comprising:

a valve body;

a regulator assembly internal to the body for pressure-regulating the air supplied to the brake system; and a single double-check valve internal to the body, the single double-check valve allowing the pressure-regulated air to flow from the regulator assembly to the at least one brake valve, the electronic control unit controlling the at least one brake valve to apply brake pressure to the at least one slipping wheel until traction with the road surface is obtained.

5. The valve of claim 4 further comprising a solenoid valve internal to the body, the solenoid valve being controlled by the electronic control unit to allow the pressure-regulated air to flow from the regulator assembly to the double-check valve.

6. A valve for controlling the traction of at least one vehicle wheel slipping on road surface, the traction control valve for use with a vehicular air brake system including at least one brake valve controlled by an electronic control unit, the traction control valve comprising:

a valve body;

a regulator assembly internal to the body for pressure-regulating the air supplied to the brake system;

a double-check valve internal to the body, the double-check valve allowing the pressure-regulated air to flow from the regulator assembly to the at least one brake valve, the electronic control unit controlling the at least one brake valve to apply brake pressure to the at least one slipping wheel until traction with the road surface is obtained;

a solenoid valve internal to the body, the solenoid valve being controlled by the electronic control unit to allow the pressure-regulated air to flow from the regulator assembly to the double-check valve; and wherein the brake system includes a relay valve having a control air line in fluid communication with the double-check valve, the relay valve amplifying the flow and maintaining the pressure of the air provided to the at least one brake valve from the double-check valve.

7. A traction control valve for controlling the traction of at least one vehicle wheel slipping on a road surface, the traction control valve for use with a vehicular air brake system including at least one brake valve controlled by an electronic control unit, the traction control valve comprising:

a valve body;

a regulator assembly internal to the body, the regulator assembly for pressure-regulating the air supplied to the brake system;

a single double-check valve internal to the body; and a solenoid valve internal to the body, the solenoid valve being controlled by the electronic control unit to allow the pressure-regulated air to flow from the regulator assembly to the double-check valve;

the double-check valve allowing the pressure-regulated air to flow from the solenoid valve to the brake system, the electronic control unit controlling the at least one brake valve to apply brake pressure to the at least one slipping wheel until traction with the road surface is obtained.

8. The valve of claim 7 wherein the brake system includes a pressurized air supply in fluid communication with the regulator assembly and wherein the electronic control unit controls the traction control valve during two modes of vehicle operation, such that pressure-regulated air from the regulator assembly flows to the at least one brake valve during one mode of operation, and air from the pressurized air supply flows to the at least one brake valve during the other mode of operation.

9. A combination anti-lock air brake and traction control system for use on a vehicle having at least one wheel with a brake, the system being controlled by an electronic control unit during two modes of vehicle operation, the system comprising:

a source of pressurized air;

an air brake system relay valve in fluid communication with the source of pressurized air, the relay valve including a control air line;

at least one brake valve, positioned proximate the brake, for supplying air from the relay valve to the brake, the at least one brake valve being controlled by the electronic control unit; and a traction control valve in fluid communication with the source of pressurized air and the control air line of the relay valve, the traction control valve including a valve body and a pressure regulator internal to the body, a solenoid valve internal to the body and a double-check valve internal to the body, the electronic control unit controlling the traction control valve to apply the brake to the wheel during the two modes of vehicle operation.

10. The braking system of claim 9 wherein the traction control valve provides pressure-regulated air to the control air line of the air brake system relay valve for distribution to the at least one brake valve during one mode of vehicle operation, and wherein the traction control valve provides air from the pressurized source to the control air line brake air system relay valve for distribution to the at least one brake valve during the other mode of vehicle operation.

11. The braking system of claim 10 wherein the one mode of operation is a traction control mode during which the at least one vehicle wheel is slipping on a road surface, the electronic control unit controlling the at least one brake valve to apply brake pressure to the slipping wheel until traction with the road surface is obtained.

12. The braking system of claim 10 wherein the other mode of operation is an anti-lock braking mode during which the at least one vehicle wheel is skidding on a road surface, the electronic control unit controlling the at least one brake valve to vary brake pressure to the at least one wheel until the at least one vehicle wheel rotates on the road surface.

13. The braking system of claim 10 wherein the air brake system relay valve amplifies the flow and maintains the pressure of the air provided to the brake valve from the double-check valve during the one mode of operation.

14. The braking system of claim 10 wherein the brake air system relay valve amplifies the flow and maintains the pressure of the air provided to the brake valve from the pressurized supply during the other mode of operation.

15. The braking system of claim 10 wherein the pressure-regulated air has a pressure of about 40 psi.

* * * * *